(12) United States Patent
Lee et al.

(10) Patent No.: US 9,905,854 B2
(45) Date of Patent: Feb. 27, 2018

(54) ELECTRODE FOR RECHARGEABLE LITHIUM BATTERY AND RECHARGEABLE LITHIUM BATTERY INCLUDING THE SAME

(71) Applicant: SAMSUNG SDI CO., LTD., Yongin-si, Gyeonggi-do (KR)

(72) Inventors: Jin-Hyon Lee, Yongin-si (KR); Ju-Hee Sohn, Yongin-si (KR); Jung-Yeon Won, Yongin-si (KR); Eun-Young Goh, Yongin-si (KR); Jong-Ki Lee, Yongin-si (KR); Sang-In Park, Yongin-si (KR)

(73) Assignee: SAMSUNG SDI CO., LTD., Yongin-Si, Gyeonggi-Do (KR)

(*) Notice: Subject to any disclaimer, the term of this patent is extended or adjusted under 35 U.S.C. 154(b) by 175 days.

(21) Appl. No.: 14/157,610

(22) Filed: Jan. 17, 2014

(65) Prior Publication Data

US 2015/0064556 A1    Mar. 5, 2015

Related U.S. Application Data

(60) Provisional application No. 61/873,031, filed on Sep. 3, 2013.

(51) Int. Cl.
| | |
|---|---|
| H01M 4/13 | (2010.01) |
| H01M 4/62 | (2006.01) |
| H01M 4/36 | (2006.01) |
| H01M 4/131 | (2010.01) |
| H01M 2/36 | (2006.01) |
| H01M 4/139 | (2010.01) |
| H01M 10/052 | (2010.01) |

(52) U.S. Cl.
CPC .............. *H01M 4/62* (2013.01); *H01M 4/13* (2013.01); *H01M 4/366* (2013.01); *H01M 2/36* (2013.01); *H01M 4/131* (2013.01); *H01M 4/139* (2013.01); *H01M 4/625* (2013.01); *H01M 10/052* (2013.01)

(58) Field of Classification Search
CPC ............ H01M 4/62; H01M 4/02; H01M 4/13; H01M 4/366; H01M 4/131
See application file for complete search history.

(56) References Cited

U.S. PATENT DOCUMENTS

| 5,665,491 | A | * | 9/1997 | Tomiyama et al. | ........ | 429/218.1 |
| 6,890,685 | B2 | | 5/2005 | Yamamoto et al. | | |

(Continued)

FOREIGN PATENT DOCUMENTS

| CN | 1918731 A1 | 2/2007 |
| CN | 101159324 A | 4/2008 |

(Continued)

OTHER PUBLICATIONS

Search Report dated Dec. 1, 2014 in corresponding European Patent Application No. 14181916.9-1360.

(Continued)

*Primary Examiner* — Jimmy Vo
(74) *Attorney, Agent, or Firm* — Lee & Morse, P.C.

(57) ABSTRACT

An electrode for a rechargeable battery and a rechargeable battery, the electrode including a current collector; an electrode active material layer; and an electrolyte solution impregnation layer, wherein the electrolyte solution impregnation layer includes a metal oxide and a conductive material.

17 Claims, 4 Drawing Sheets

(56) References Cited

U.S. PATENT DOCUMENTS

| | | |
|---|---|---|
| 7,202,000 B2 | 4/2007 | Iriyama et al. |
| 2005/0084758 A1 | 4/2005 | Yamamoto et al. |
| 2005/0208380 A1* | 9/2005 | Park .................. H01M 4/13 |
| | | 429/232 |
| 2007/0026316 A1 | 2/2007 | Imachi et al. |
| 2008/0299457 A1 | 12/2008 | Muraoka et al. |
| 2011/0168550 A1 | 7/2011 | Wang et al. |
| 2012/0003544 A1 | 1/2012 | Nakayama et al. |
| 2012/0009475 A1 | 1/2012 | Nakura |
| 2013/0101902 A1 | 4/2013 | Son et al. |
| 2013/0149605 A1 | 6/2013 | Kakehata et al. |

FOREIGN PATENT DOCUMENTS

| | | |
|---|---|---|
| CN | 101320822 A | 12/2008 |
| EP | 1-184-918 A2 | 3/2002 |
| EP | 1-282-179 A2 | 2/2003 |
| JP | 2007-328977 A | 12/2007 |
| KR | 10-2004-0056895 A | 7/2004 |
| KR | 10-2009-0038357 A | 4/2009 |
| KR | 10-2011-0127209 A | 11/2011 |
| WO | WO 01/97304 A1 | 12/2001 |
| WO | WO 2005/076391 A1 | 8/2005 |
| WO | WO 2007/111895 A2 | 10/2007 |
| WO | WO 2012/159111 A1 | 11/2012 |
| WO | WO 2013/062177 A1 | 5/2013 |

OTHER PUBLICATIONS

European Office Action dated Apr. 11, 2016 in Corresponding European Patent Application No. 14181916.9.
Office Action dated Dec. 26, 2017, of the corresponding Chinese Patent Application No. 201410269750.9.

\* cited by examiner

ELECTRODE FOR RECHARGEABLE LITHIUM BATTERY AND RECHARGEABLE LITHIUM BATTERY INCLUDING THE SAME

CROSS-REFERENCE TO RELATED APPLICATION

The present application claims priority under 35 U.S.C. § 119 to U.S. Provisional Application No. 61/873,031, filed on Sep. 3, 2013, and entitled: "Electrode For Rechargeable Lithium Battery and Rechargeable Lithium Battery Including The Same," which is incorporated herein by reference in its entirety.

BACKGROUND

1. Field

Embodiments relate to an electrode for a rechargeable lithium battery and a rechargeable lithium battery including the same.

2. Description of the Related Art

Due to reductions in size and weight of portable electronic equipment, rechargeable lithium batteries for the portable electronic equipment may have both high performance and large capacity.

Such a rechargeable lithium battery may be manufactured by injecting an electrolyte into a battery cell (which includes a positive electrode including a positive active material capable of intercalating/deintercalating lithium ions and a negative electrode including a negative active material capable of intercalating/deintercalating lithium ions).

SUMMARY

Embodiments are directed to an electrode for a rechargeable lithium battery and a rechargeable lithium battery including the same.

The embodiments may be realized by providing an electrode for a rechargeable battery, the electrode including a current collector; an electrode active material layer; and an electrolyte solution impregnation layer, wherein the electrolyte solution impregnation layer includes a metal oxide and a conductive material.

The electrolyte solution impregnation layer may be closer to the current collector than an external surface of the electrode.

The electrode active material layer may include a first electrode active material layer and a second electrode active material layer, the electrolyte solution impregnation layer being between the first electrode active material layer and the second electrode active material layer.

The first electrode active material layer may be between the current collector and the electrolyte solution impregnation layer.

The first electrode active material layer may have a thickness that is smaller than a thickness of the second electrode active material layer.

The conductive material may be on a surface of the metal oxide.

The conductive material may surround at least a part of the surface of the metal oxide.

The metal oxide may include $Al_2O_3$, $TiO_2$, $CeO_2$, $ZnO_2$, $ZrO_2$, $V_2O_5$, $HfO_2$, $MnO_2$, $MgO$, $WO_2$, or a combination thereof.

The conductive material may include a carbon-based material, a metal, or a combination thereof.

The conductive material may include the carbon-based material, the carbon based material including a carbon nanotube, a carbon nanofiber, carbon black, acetylene black, ketjen black, graphene, or a combination thereof.

The conductive material may include the metal, the metal including copper, aluminum, nickel, silver, gold, or a combination thereof.

The conductive material may be included in the electrolyte solution impregnation layer in an amount of about 5 parts by weight to about 30 parts by weight, based on 100 parts by weight of the metal oxide.

A thickness of the electrolyte solution impregnation layer may be about 0.2% to about 20% of a total thickness of the electrode.

A total thickness of the active material layer and the electrolyte solution impregnation layer may be about 50 μm to about 300 μm.

The electrolyte solution impregnation layer may be different from the active material layer.

The metal oxide may be different from the conductive material.

The metal oxide may provide a pathway for movement of lithium ions, and the conductive material may provide a pathway for movement of electrons.

The embodiments may also be realized by providing a rechargeable battery including an electrode assembly, the electrode assembly including a first electrode, a second electrode, and a separator between the first electrode and the second electrode, wherein at least one of the first electrode or second electrode includes a current collector, an electrode active material layer, and an electrolyte solution impregnation layer, and the electrolyte solution impregnation layer includes a metal oxide and a conductive material.

The electrolyte solution impregnation layer may be closer to the current collector than an external surface of the at least one of the first electrode or the second electrode.

The electrode active material layer may include a first electrode active material layer and a second electrode active material layer, the electrolyte solution impregnation layer being between the first electrode active material layer and the second electrode active material layer.

BRIEF DESCRIPTION OF THE DRAWINGS

Features will be apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

An electrode may include a current collector and an electrode active material layer (coated on the current collector). An electrolyte solution having hydrophilicity may be difficult to impregnate in the electrode due to hydrophobicity of an electrode active material (such as graphite or the like) or a conductive material. Also, even though the electrolyte solution may be impregnated through vacuum injection, the electrolyte solution may flow out again due to affinity difference of the electrolyte solution to the electrode active material or the conductive material as time elapses. Thus, a concentration gradient may be formed inside the electrode. This phenomenon may become more evident in a thicker, high-capacity electrode.

An electrode for a rechargeable lithium battery according to an embodiment may include a current collector and an electrode plate layer on the current collector. The electrode plate layer may include at least one electrode active material layer and electrolyte solution impregnation layer. For example, the electrolyte solution impregnation layer (having excellent impregnation capability of an electrolyte solution) may be included inside the electrode plate layer. Thus, the electrolyte solution may be smoothly supplied into the electrode and impregnation of the electrolyte solution. Accordingly, the electrolyte solution impregnation layer may facilitate mobility of lithium ions inside the thick high-capacity electrode (e.g., a 'thick film electrode'). Thus, cycle-life and output characteristics of a rechargeable lithium battery may be improved.

For example, the electrolyte solution impregnation layer inside the electrode plate layer may be positioned closer to the current collector than the external surface of the electrode plate layer. When the electrolyte solution impregnation layer is much closer to the current collector in the electrode plate layer, a concentration gradient may become minimized due to the difficulty in impregnation of the electrolyte solution. For example, when the electrolyte solution impregnation layer is positioned close to the current collector in the electrode plate layer, the electrolyte solution may be smoothly supplied and impregnated and mobility of lithium ions inside an electrode may be facilitated.

In an implementation, the electrode active material layer may include a first electrode active material layer and a second electrode active material layer. The electrolyte solution impregnation layer may be interposed between the first electrode active material layer and the second electrode active material layer. The first electrode active material layer may be between the current collector and the electrolyte solution impregnation layer.

In an implementation, the first electrode active material layer and the second electrode active material layer may have the same thickness or may have different thicknesses. For example, the first electrode active material layer may have a thickness that is smaller than a thickness of the second electrode active material layer.

The electrode active material layer may include an electrode active material. The electrolyte solution impregnation layer may include a metal oxide and a conductive material. The electrolyte solution impregnation layer may be different from the active material layer.

The conductive material may be included on a surface of the metal oxide. In an implementation, the conductive material may surround at least a part of the surface of the metal oxide.

The metal oxide may facilitate movement of lithium ions and may speed up such movement. In addition, the electrode active material layer may be electrically connected through the conductive material. For example, the electrolyte solution impregnation layer may have high electric conductivity and excellent impregnation of an electrolyte solution and may help minimize a concentration gradient of lithium ions inside an electrode and may help improve cycle-life and output characteristics of a rechargeable lithium battery. The metal oxide may provide a pathway for movement of lithium ions, and the conductive material provides a pathway for movement of electrons.

Figure 1:
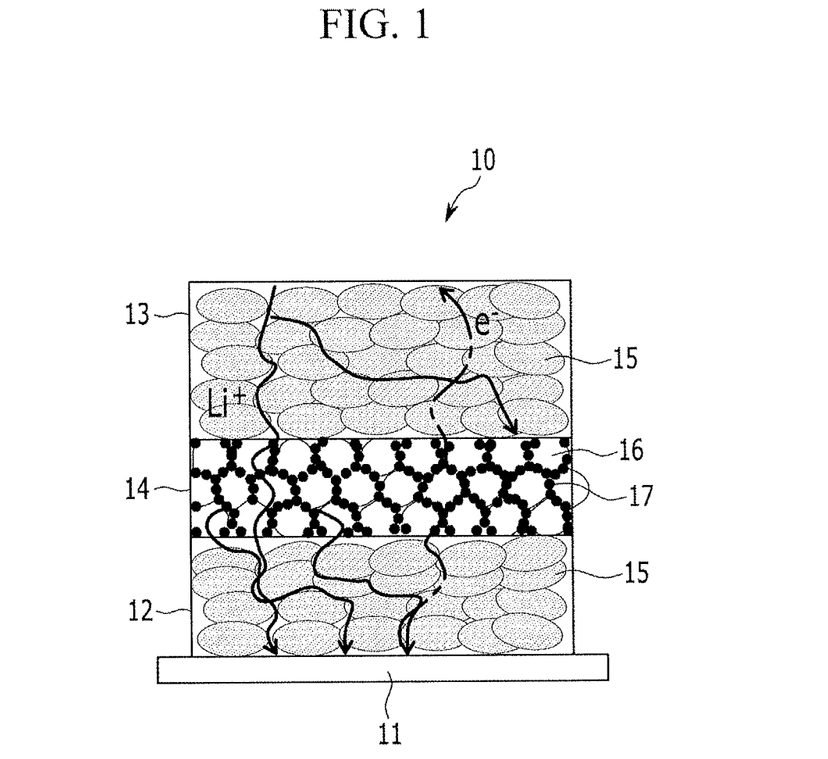
FIG. 1 illustrates a schematic view of a structure of an electrode for a rechargeable lithium battery according to one embodiment.

The electrode for a rechargeable lithium battery is specifically described referring to FIG. 1. FIG. 1 is provided as one example to facilitate understanding, but the structure of an electrode for a rechargeable lithium battery according to one embodiment is not limited thereto.

FIG. 1 illustrates a schematic view showing a structure of an electrode for a rechargeable lithium battery according to one embodiment.

Referring to FIG. 1, an electrode for a rechargeable lithium battery 10 according to one embodiment may include a current collector 11 and an electrode plate layer on the current collector 11. The electrode plate layer may include a first electrode active material layer 12, a second electrode active material layer 13, and an electrolyte solution impregnation layer 14 between the first electrode active material layer 12 and the second electrode active material layer 13. The first and second electrode active material layers 12 and 13 may respectively include an electrode active material 15. The electrolyte solution impregnation layer 14 may include a metal oxide 16 and a conductive material 17 surrounding at least a part of the surface of the metal oxide 16.

In addition, FIG. 1 illustrates movement of lithium ions and electrons. The lithium ions may move from an external surface of the electrode plate layer through the metal oxide 16 near or proximate to the current collector 11. The electrons may move through the conductive material 17. Thus it may be seen that the electrode active material layer is electrically connected to itself.

The metal oxide may include, e.g., $Al_2O_3$, $TiO_2$, $CeO_2$, $ZnO_2$, $ZrO_2$, $V_2O_5$, $HfO_2$, $MnO_2$, $MgO$, $WO_2$ or a combination thereof. In an implementation, the metal oxide may be different from the conductive material.

The conductive material may include, e.g., a carbon-based material such as carbon nanotube, a carbon nanofiber, carbon black, acetylene black, ketjen black, graphene, or a combination thereof; a metal such as Cu, Al, Ni, Ag, Au or combination thereof; or a combination thereof.

The conductive material may be included in an amount of about 5 to about 30 parts by weight, e.g., about 5 to about 10 parts by weight, based on 100 parts by weight of the metal oxide. When the conductive material is included within the range, an electrolyte solution impregnation layer may help secure excellent impregnation of an electrolyte solution and high electric conductivity. Accordingly, movement of lithium ions inside an electrode may be facilitated and a rechargeable lithium battery having excellent cycle-life and output characteristics may be realized.

The first and second electrode active material layers may have the same thickness or different thicknesses. For example, when the first electrode active material layer is positioned on the current collector, as shown in FIG. 1, the first electrode active material layer may have a smaller thickness than that of the second electrode active material layer. For example, the electrolyte solution impregnation layer may be positioned closer to the current collector than the external surface of the electrode plate layer.

In an implementation, a thickness of the electrode plate layer may be about 50 μm to about 300 μm, e.g., about 100 μm to about 200 μm. When the electrode plate layer has a thickness within the range, a rechargeable lithium battery having high-capacity may be realized.

A thickness of the electrolyte solution impregnation layer may be about 0.2 to about 20%, e.g., about 0.2 to about 10%, of a thickness of the electrode (including the current collector and the electrode plate layer). When the electrolyte solution impregnation layer has a thickness within the range, movement of lithium ions may be facilitated.

The electrode active material layer may include an electrode active material, and may additionally include at least one of a binder and a conductive material.

The electrode active material may include a suitable positive active material or negative active material for a rechargeable lithium battery.

For example, the positive active material may include a compound (lithiated intercalation compound) that is capable of intercalating and deintercalating lithium. In an implementation, the positive active material may include a compound represented by one of the following chemical formulae.

$Li_aA_{1-b}B_bD_2$ (wherein, in the above chemical formula, $0.90 \leq a \leq 1.8$ and $0 \leq b \leq 0.5$); $Li_aE_{1-b}B_bO_{2-c}D_c$ (wherein, in the above chemical formula, $0.90 \leq a \leq 1.8$, $0 \leq b \leq 0.5$, $0 \leq c \leq 0.05$); $LiE_{2-b}B_bO_{4-c}D_c$ (wherein, in the above chemical formula, $0 \leq b \leq 0.5$, $0 \leq c \leq 0.05$); $Li_aNi_{1-b-c}Co_bB_cD_\alpha$ (wherein, in the above chemical formula, $0.90 \leq a \leq 1.8$, $0 \leq b \leq 0.5$, $0 \leq c \leq 0.05$, $0 \leq \alpha \leq 2$); $Li_aNi_{1-b-c}Co_bB_cO_{2-\alpha}F_\alpha$ (wherein, in the above chemical formula, $0.90 \leq a \leq 1.8$, $0 \leq b \leq 0.5$, $0 \leq c \leq 0.05$, $0 \leq \alpha \leq 2$); $Li_aNi_{1-b-c}Co_bB_cO_{2-\alpha}F_2$ (wherein, in the above chemical formula, $0.90 \leq a \leq 1.8$, $0 \leq b \leq 0.5$, $0 \leq c \leq 0.05$, $0 < \alpha < 2$); $Li_aNi_{1-b-c}Mn_bB_cD_\alpha$ (wherein, in the above chemical formula, $0.90 \leq a \leq 1.8$, $0 \leq b \leq 0.5$, $0 \leq c \leq 0.05$, $0 < \alpha \leq 2$); $Li_aNi_{1-b-c}Mn_bB_cO_{2-\alpha}F_\alpha$ (wherein, in the above chemical formula, $0.90 \leq a \leq 1.8$, $0 \leq b \leq 0.5$, $0 \leq c \leq 0.05$, $0 < \alpha < 2$); $Li_aNi_{1-b-c}Mn_bB_cO_{2-\alpha}F_2$ (wherein, in the above chemical formula, $0.90 \leq a \leq 1.8$, $0 \leq b \leq 0.5$, $0 \leq c \leq 0.05$, $0 < \alpha < 2$); $Li_aN_{ib}E_cG_dO_2$ (wherein, in the above chemical formula, $0.90 \leq a \leq 1.8$, $0 \leq b \leq 0.9$, $0 \leq c \leq 0.5$, $0.001 \leq d \leq 0.1$); $Li_aNi_bCo_cMn_dGeO_2$ (wherein, in the above chemical formula, $0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ (wherein, in the above chemical formula, $0.90 \leq a \leq 1.8$, $0.001 \leq b \leq 0.1$); $Li_aCoG_bO_2$ (wherein, in the above chemical formula, $0.90 \leq a \leq 1.8$, $0.001 \leq b \leq 0.1$); $Li_aMnG_bO_2$ (wherein, in the above chemical formula, $0.90 \leq a \leq 1.8$, $0.001 \leq b \leq 0.1$); $Li_aMn_2G_bO_4$ (wherein, in the above chemical formula, $0.90 \leq a \leq 1.8$, $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

in the above chemical formulae, A may be Ni, Co, Mn, or a combination thereof; B may be Al, Ni, Co, Mn, Cr, Fe, Mg, Sr, V, a rare earth element, or a combination thereof; D may be O, F, S, P, or a combination thereof; E may be Co, Mn, or a combination thereof; F may be F, S, P, or a combination thereof; G may be Al, Cr, Mn, Fe, Mg, La, Ce, Sr, V, or a combination thereof; Q may be Ti, Mo, Mn, or a combination thereof; I may be Cr, V, Fe, Sc, Y, or a combination thereof; and J may be V, Cr, Mn, Co, Ni, Cu, or a combination thereof.

The negative active material may include a material that reversibly intercalates/deintercalates lithium ions, a lithium metal, a lithium metal alloy, a material capable of doping and dedoping lithium, or a transition metal oxide.

The material that reversibly intercalates/deintercalates lithium ions may be a carbon material that is suitable used for a carbon-based negative active material rechargeable lithium battery. Examples thereof may include crystalline carbon, amorphous carbon, or a mixture thereof. Examples of the crystalline carbon may include graphite such as amorphous, sheet-shaped, flake, spherical shaped, or fiber-shaped natural graphite or artificial graphite. Examples of the amorphous carbon may include soft carbon (low temperature fired carbon), hard carbon, a mesophase pitch carbonized product, fired coke, and the like.

The lithium metal alloy may include an alloy of lithium and a metal selected from Na, K, Rb, Cs, Fr, Be, Mg, Ca, Sr, Si, Sb, Pb, In, Zn, Ba, Ra, Ge, Al, or Sn.

The material capable of doping and dedoping lithium may include, e.g., Si, $SiO_x$ ($0<x<2$), a Si—C composite, a Si—Y alloy (wherein Y is an element selected from an alkali metal, an alkaline-earth metal, Group 13 to 16 elements, a transition metal, a rare earth element, and a combination thereof, and not Si), Sn, $SnO_2$, a Sn—C composite, Sn—Y (wherein Y is an element selected from an alkali metal, an alkaline-earth metal, Group 13 to 16 elements, a transition metal, a rare earth element and a combination thereof, and not Sn), and the like, and at least one of these may be mixed with $SiO_2$. The element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The transition metal oxide may include, e.g., vanadium oxide, lithium vanadium oxide, or the like.

The binder may help improve binding properties of the electrode active material and the acrylonitrile-based resin with each other, and the electrode active material with the current collector. Examples of the binder may include polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

The conductive agent may help improve conductivity of an electrode. A suitable electrically conductive agent that does not cause a chemical change may be used as a conductive agent. Examples of the conductive agent may include a carbon-based material such as natural graphite, artificial graphite, carbon black, acetylene black, ketjen black, a carbon fiber, and the like; a metal-based material of a metal powder or a metal fiber and the like of copper, nickel, aluminum, silver, and the like; a conductive polymer such as a polyphenylene derivative and the like; or a mixture thereof.

The electrode active material layer may be formed on the current collector. The current collector may include, e.g., aluminum, a copper foil, a nickel foil, a stainless steel foil, a titanium foil, a nickel foam, a copper foam, a polymer substrate coated with a conductive metal, or a combination thereof.

The electrode may be manufactured by applying the electrode plate layer composition on the current collector, and drying and compressing the same.

For example, an electrode having a structure of FIG. 1 may be manufactured as follows.

A first electrode active material layer may be formed on the current collector by coating and drying a first electrode active material layer composition, an electrolyte solution impregnation layer may be formed on the first electrode active material layer, and subsequently, a second electrode active material layer may be formed on the electrolyte solution impregnation layer by coating and drying a second electrode active material layer composition. This electrode plate layer on the current collector may be compressed, forming an electrode for a rechargeable lithium battery.

In addition, an electrode for a rechargeable lithium battery may be manufactured by coating a first electrode active material layer composition on the current collector, coating an electrolyte solution impregnation layer composition thereon, and coating a second electrode active material layer composition thereon and then, drying and compressing them to form an electrode plate layer, e.g., an electrode plate layer sequentially including a first electrode active material layer, an electrolyte solution impregnation layer, and a second electrode active material layer on the current collector.

In an implementation, a first electrode active material layer composition, an electrolyte solution impregnation layer composition, and a second electrode active material layer composition may be simultaneously coated in a slot die coating method and then, dried and compressed on the current collector to form an electrode plate layer sequentially including a first electrode active material layer, an electrolyte solution impregnation layer, and a second electrode active material layer, providing an electrode including the electrode plate layer for a rechargeable lithium battery.

The electrode may be used as at least one of a positive electrode and a negative electrode in a rechargeable lithium battery.

Hereinafter, a rechargeable lithium battery including the electrode is described referring to FIG. 2.

Figure 2:
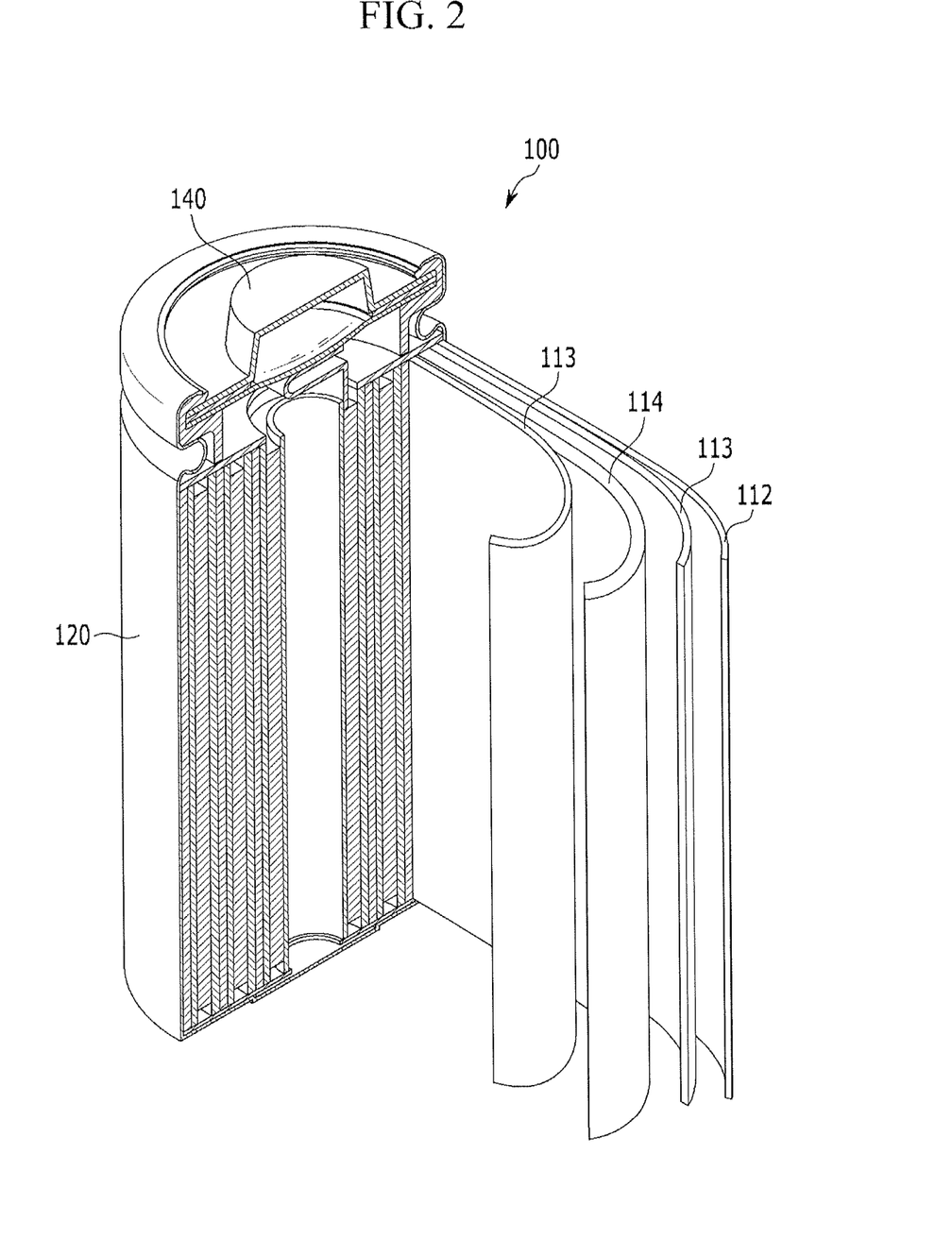
FIG. 2 illustrates a schematic view of a rechargeable lithium battery according to one embodiment.

FIG. 2 illustrates a schematic view of a rechargeable lithium battery according to one embodiment.

Referring to FIG. 2, a rechargeable lithium battery 100 according to one embodiment may include an electrode assembly including a positive electrode 114, a negative electrode 112 facing the positive electrode 114, a separator 113 interposed between the positive electrode 114 and negative electrode 112, and an electrolyte solution (not shown) impregnated in the positive electrode 114, the negative electrode 112, and the separator 113, a battery case 120 housing the electrode assembly, and a sealing member 140 sealing the battery case 120.

At least one of the positive electrode and the negative electrode may be the above electrode according to an embodiment.

The electrolyte solution may include a non-aqueous organic solvent and a lithium salt.

The non-aqueous organic solvent may serve as a medium for transmitting ions taking part in the electrochemical reaction of a battery. The non-aqueous organic solvent may be selected from a carbonate-based, ester-based, ether-based, ketone-based, alcohol-based, or aprotic solvent.

The carbonate-based solvent may include, e.g., dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), or the like.

For example, when the linear carbonate compounds and cyclic carbonate compounds are mixed, an organic solvent having a high dielectric constant and low viscosity may be provided. In an implementation, the cyclic carbonate and the linear carbonate may be mixed together in a volume ratio of, e.g., about 1:1 to 1:9.

In an implementation, the ester-based solvent may include, e.g., methylacetate, ethylacetate, n-propylacetate, dimethylacetate, methylpropionate, ethylpropionate, γ-butyrolactone, decanolide, valerolactone, mevalonolactone, caprolactone, or the like. The ether solvent may include, e.g., dibutylether, tetraglyme, diglyme, dimethoxyethane, 2-methyltetrahydrofuran, tetrahydrofuran, or the like. The ketone-based solvent may include, e.g., cyclohexanone or the like. In an implementation, the alcohol-based solvent may include, e.g., ethanol, isopropyl alcohol, or the like.

The non-aqueous organic solvent may be used singularly or in a mixture, and when the organic solvent is used in a mixture, the mixture ratio may be selected or controlled in accordance with a desired battery performance.

The electrolyte solution may further include an overcharge inhibitor additive, e.g., ethylenecarbonate, pyrocarbonate, or the like.

The lithium salt may be dissolved in an organic solvent, may supply lithium ions in a battery, may basically operate the rechargeable lithium battery, and may help improve lithium ion transportation between positive and negative electrodes therein.

Examples of the lithium salt may include $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, LiCl, LiI, $LiB(C_2O_4)_2$ (lithium bis(oxalato)borate, LiBOB), or a combination thereof.

The lithium salt may be used in a concentration of about 0.1 M to about 2.0 M. When the lithium salt is included within the above concentration range, an electrolyte may have excellent performance and lithium ion mobility due to optimal electrolyte conductivity and viscosity.

The separator 113 may include a suitable material and may separate a negative electrode 112 from a positive electrode 114 and may provide a transporting passage for lithium ion. For example, the separator 113 may have a low resistance to ion transportation and an excellent impregnation for an electrolyte. In an implementation, the material for the separator 113 may include, e.g., glass fiber, polyester, TEFLON (tetrafluoroethylene), polyethylene, polypropylene, polytetrafluoroethylene (PTFE), or a combination thereof and may have a form of a non-woven fabric or a woven fabric. For example, a polyolefin-based polymer separator such as polyethylene, polypropylene or the like may be used for a lithium ion battery. In order to ensure the heat resistance or mechanical strength, a coated separator including a ceramic component or a polymer material may be used. In an implementation, it may have a mono-layered or multi-layered structure.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

First and second negative active material layer compositions were respectively prepared by mixing 98 wt % of natural graphite, 1 wt % of carboxylmethyl cellulose (CMC), and 1 wt % of a styrene-butadiene rubber (SBR), and dispersing the mixture in water.

An electrolyte solution impregnation layer composition was prepared by mixing 100 parts by weight of $Al_2O_3$ and 10 parts by weight of carbon black.

The first negative active material layer composition, the electrolyte solution impregnation layer composition, and the second negative active material layer composition were simultaneously coated on a 15 μm-thick copper foil in a slot die coating method and dried and compressed to sequentially form a first negative active material layer, an electrolyte solution impregnation layer, and a second negative active material layer on the copper foil, manufacturing a negative electrode. Herein, the first negative active material layer was 50 μm thick, the electrolyte solution impregnation layer was 5 μm thick, and the second negative active material layer was 100 μm thick.

The negative electrode and a lithium metal as a counter electrode were housed in a battery case, and an electrolyte solution was injected into the battery case, manufacturing a rechargeable lithium battery cell.

Herein, the electrolyte solution was prepared by mixing ethylenecarbonate (EC), diethylcarbonate (DEC), and fluoroethylenecarbonate (FEC) in a volume ratio of 5:70:25 and preparing a 1.15M $LiPF_6$ solution in the mixed solvent.

Example 2

A rechargeable lithium battery cell was manufactured according to the same method as Example 1 except for forming the first negative active material layer to be 70 μm thick, the electrolyte solution impregnation layer to be 3 μm thick, and the second negative active material layer to be 80 μm thick, to manufacture a negative electrode.

Example 3

A rechargeable lithium battery cell was manufactured according to the same method as Example 1 except for using an electrolyte solution impregnation layer composition prepared by mixing 100 parts by weight of $CeO_2$ and 10 parts by weight of carbon black, instead of the electrolyte solution impregnation layer in Example 1.

Comparative Example 1

A rechargeable lithium battery cell was manufactured according to the same method as Example 1 except for preparing a negative active material layer composition by mixing 98 wt % of natural graphite, 1 wt % of carboxylmethyl cellulose, and 1 wt % of a styrene-butadiene rubber and dispersing the mixture in water, coating the negative active material layer composition on a 15 μm-thick copper foil and then, drying and compressing it to manufacture a negative electrode.

Comparative Example 2

A rechargeable lithium battery cell was manufactured according to the same method as Example 1 except for preparing a negative active material layer composition by mixing 97 wt % of natural graphite, 1 wt % of carboxylmethyl cellulose, 1 wt % of a styrene-butadiene rubber. and 1 wt % of $Al_2O_3$ and dispersing the mixture in water, coating the negative active material layer composition on a 15 μm-thick copper foil and then, drying and compressing it to manufacture a negative electrode.

Evaluation 1: Cycle-Life Characteristics

Figure 3:
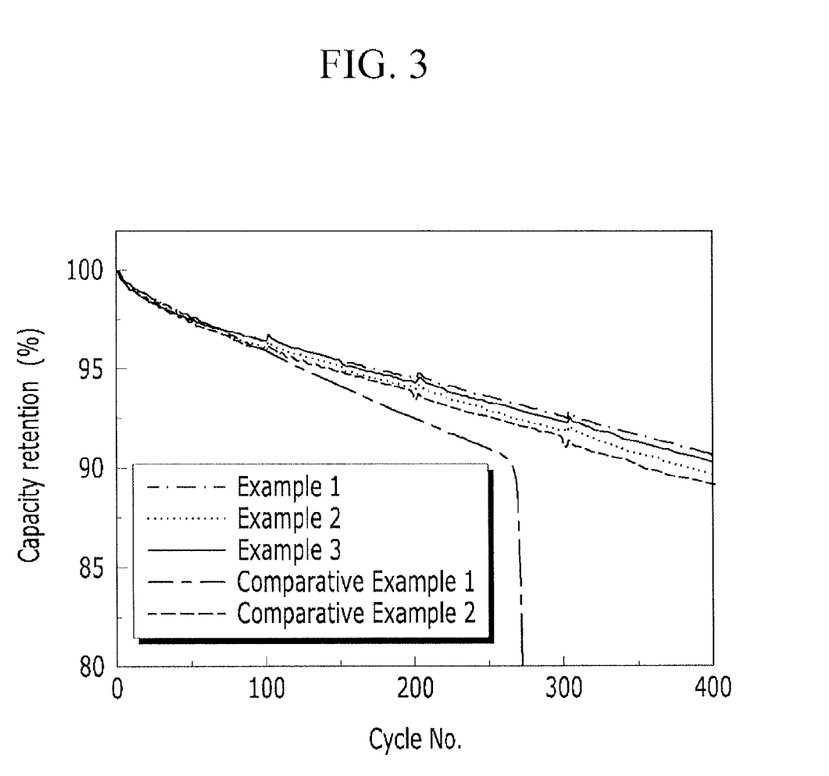
FIG. 3 illustrates a graph showing cycle-life characteristics of the rechargeable lithium battery cells according to Examples 1 to 3 and Comparative Examples 1 and 2.

The rechargeable lithium battery cells according to Examples 1 to 3 and Comparative Examples 1 and 2 were charged at 0.7 C and discharged at 0.5 C within a range of 2.8 V to 4.2 V, then, their cycle-life characteristics were measured, and the results are provided in FIG. 3.

FIG. 3 illustrates a graph showing cycle-life characteristics of the rechargeable lithium battery cells according to Examples 1 to 3 and Comparative Examples 1 and 2.

Referring to FIG. 3, Examples 1 to 3 (including an electrolyte solution impregnation layer including a metal oxide and a conductive material in an electrode plate layer regardless of an electrode active material layer) exhibited excellent cycle-life characteristic compared with Comparative Example 1 (including no electrolyte solution impregnation layer) and Comparative Example 2 (including a mixture of a metal oxide and an electrode active material in an electrode plate layer). Without being bound by theory, it is believed that the presence of the electrolyte solution impregnation layer helped smoothly supply an electrolyte solution inside an electrode and helped improve impregnation of the electrolyte solution, and resultantly, facilitated mobility of lithium ions inside the electrode, even though the electrode was relatively thick.

Evaluation 2: Output Characteristics

Figure 4:
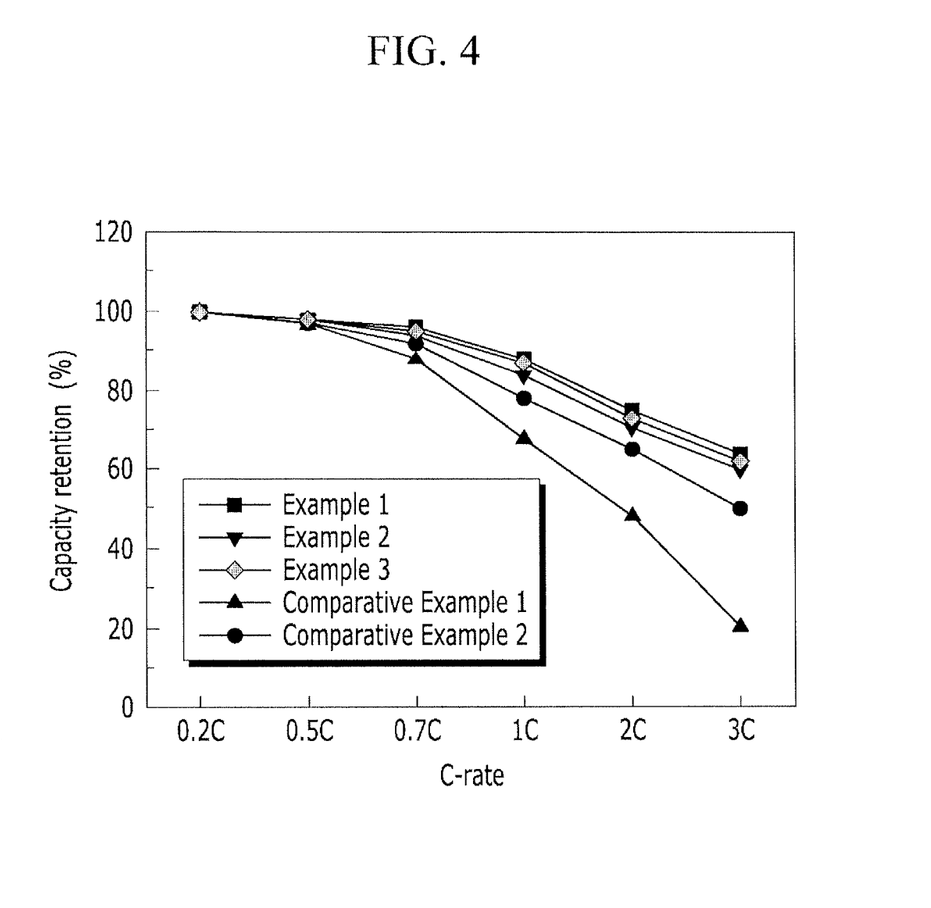
FIG. 4 illustrates a graph showing high-rate charge and discharge characteristics of the rechargeable lithium battery cells according to Examples 1 to 3 and Comparative Examples 1 and 2.

The rechargeable lithium battery cells according to Examples 1 to 3 and Comparative Examples 1 and 2 were charged at 0.2 C within a range of 2.8 V to 4.2 V and discharged respectively at 0.2 C, 0.5 C, 0.7 C, 1 C, 2 C, and 3 C, their high rate discharge characteristics were measured, and the results are provided in FIG. 4.

FIG. 4 illustrates a graph showing high-rate charge and discharge characteristics of the rechargeable lithium battery cells according to Examples 1 to 3 and Comparative Examples 1 and 2.

Referring to FIG. 4, Examples 1 to 3 (including an electrolyte solution impregnation layer including a metal oxide and a conductive material in an electrode plate layer regardless of an electrode active material layer) exhibited excellent output characteristics, compared with Comparative Example 1 (including no electrolyte solution impregnation layer) and Comparative Example 2 (including a mixture of metal oxide and an electrode active material in an electrode plate layer). Without being bound by theory, it is believed that the presence of the electrolyte solution impregnation layer helped smoothly supply an electrolyte solution in an electrode, helped improve impregnation of the electrolyte solution, and resultantly facilitated mobility of lithium ions inside the electrode even through the electrode was thick.

By way of summation and review, in order to realize a rechargeable lithium battery having large capacity, an electrode may be formed by coating a thick electrode active material layer on a current collector. However, if the electrode were to be too thick, lithium ions may not smoothly move inside the electrode and performance of the rechargeable lithium battery may be deteriorated.

The embodiments may provide an electrode for a rechargeable lithium battery having excellent cycle-life and output characteristics. For example, an electrolyte solution may be smoothly supplied with and impregnated into the electrode, even if the electrode is thick.

A thick electrode may be smoothly supplied with an electrolyte solution and impregnated therein and may realize a rechargeable lithium battery having excellent cycle-life and output characteristics.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

DESCRIPTION OF SYMBOLS

10: electrode
11: current collector
12: first electrode active material layer
13: second electrode active material layer
14: electrolyte solution impregnation layer
15: electrode active material
16: metal oxide
17: conductive material
100: rechargeable lithium battery
112: negative electrode
113: separator
114: positive electrode
120: battery case
140: sealing member

What is claimed is:

1. An electrode for a rechargeable battery, the electrode comprising:
    a current collector;
    an electrode active material layer; and
    an electrolyte solution impregnation layer, wherein:
        the electrolyte solution impregnation layer includes a metal oxide and a conductive material,
        the metal oxide includes $Al_2O_3$, $TiO_2$, $CeO_2$, $ZnO_2$, $ZrO_2$, $V_2O_5$, $HfO_2$, $MnO_2$, $MgO$, $WO_2$, or a combination thereof,
        the conductive material includes a carbon-based material, a metal, or a combination thereof,
        particles of the conductive material are smaller than particles of the metal oxide,
        the conductive material is on a surface of the metal oxide,
        the conductive material surrounds at least a part of the surface of the metal oxide, and
        the conductive material is included in the electrolyte solution impregnation layer in an amount of 9 parts by weight to 10 parts by weight, based on 100 parts by weight of the metal oxide.

2. The electrode as claimed in claim 1, wherein the electrolyte solution impregnation layer is closer to the current collector than an external surface of the electrode.

3. The electrode as claimed in claim 1, wherein the electrode active material layer includes a first electrode active material layer and a second electrode active material layer, the electrolyte solution impregnation layer being between the first electrode active material layer and the second electrode active material layer.

4. The electrode as claimed in claim 3, wherein the first electrode active material layer is between the current collector and the electrolyte solution impregnation layer.

5. The electrode as claimed in claim 3, wherein the first electrode active material layer has a thickness that is smaller than a thickness of the second electrode active material layer.

6. The electrode as claimed in claim 1, wherein the conductive material includes the carbon-based material, the carbon based material including a carbon nanotube, a carbon nanofiber, carbon black, acetylene black, ketjen black, graphene, or a combination thereof.

7. The electrode as claimed in claim 1, wherein the conductive material includes the metal, the metal including copper, aluminum, nickel, silver, gold, or a combination thereof.

8. The electrode as claimed in claim 1, wherein a thickness of the electrolyte solution impregnation layer is about 0.2% to about 20% of a total thickness of the electrode.

9. The electrode as claimed in claim 1, wherein a total thickness of the active material layer and the electrolyte solution impregnation layer is about 50 μm to about 300 μm.

10. The electrode as claimed in claim 1, wherein the electrolyte solution impregnation layer is different from the active material layer.

11. The electrode as claimed in claim 1, wherein the metal oxide is different from the conductive material.

12. The electrode as claimed in claim 1, wherein:
    the metal oxide provides a pathway for movement of lithium ions, and
    the conductive material provides a pathway for movement of electrons.

13. A rechargeable battery, comprising an electrode assembly, the electrode assembly including:
    a first electrode,
    a second electrode, and
    a separator between the first electrode and the second electrode,
    wherein:
        at least one of the first electrode or second electrode includes a current collector, an electrode active material layer, and an electrolyte solution impregnation layer,
        the electrolyte solution impregnation layer includes a metal oxide and a conductive material,
        the metal oxide includes $Al_2O_3$, $TiO_2$, $CeO_2$, $ZnO_2$, $ZrO_2$, $V_2O_5$, $HfO_2$, $MnO_2$, $MgO$, $WO_2$, or a combination thereof,
        the conductive material includes a carbon-based material, a metal, or a combination thereof,
        particles of the conductive material are smaller than particles of the metal oxide,
        the conductive material is on a surface of the metal oxide,
        the conductive material surrounds at least a part of the surface of the metal oxide, and
        the conductive material is included in the electrolyte solution impregnation layer in an amount of 9 parts by weight to 10 parts by weight, based on 100 parts by weight of the metal oxide.

14. The rechargeable battery as claimed in claim 13, wherein the electrolyte solution impregnation layer is closer to the current collector than an external surface of the at least one of the first electrode or the second electrode.

15. The rechargeable battery as claimed in claim 13, wherein the electrode active material layer includes a first electrode active material layer and a second electrode active material layer, the electrolyte solution impregnation layer being between the first electrode active material layer and the second electrode active material layer.

16. The rechargeable battery as claimed in claim 13, wherein the conductive material includes carbon black.

17. The rechargeable battery as claimed in claim 13, wherein the conductive material is included in the electrolyte solution impregnation layer in an amount of 10 parts by weight, based on 100 parts by weight of the metal oxide.

* * * * *